(12) United States Patent
Müller et al.

(10) Patent No.: US 6,742,807 B2
(45) Date of Patent: Jun. 1, 2004

(54) METHOD OF TRIGGERING A GAS GENERATOR FOR AN AIR BAG IN A MOTOR VEHICLE

(75) Inventors: Manfred Müller, Deizisau (DE); Harald Rudolf, Tübingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/114,330

(22) Filed: Apr. 3, 2002

(65) Prior Publication Data

US 2002/0153716 A1 Oct. 24, 2002

(30) Foreign Application Priority Data

Apr. 5, 2001 (DE) .......................................... 101 16 926

(51) Int. Cl.$^7$ ............................................... B60R 21/32
(52) U.S. Cl. ......................... 280/735; 180/282; 701/45
(58) Field of Search ....................... 280/735; 180/282; 701/45, 46, 47

(56) References Cited

U.S. PATENT DOCUMENTS

| | | | |
|---|---|---|---|
| 5,493,493 A | | 2/1996 | Shibata et al. |
| 5,709,405 A | * | 1/1998 | Saderholm et al. ......... 280/736 |
| 5,871,231 A | * | 2/1999 | Richards et al. ............ 280/735 |
| 5,927,753 A | * | 7/1999 | Faigle et al. ................. 280/735 |
| 6,068,288 A | * | 5/2000 | Karolek et al. ............. 280/735 |
| 6,237,948 B1 | * | 5/2001 | Maschek et al. ............ 280/735 |
| 6,550,807 B1 | * | 4/2003 | Faigle et al. ................. 280/736 |

FOREIGN PATENT DOCUMENTS

| | | |
|---|---|---|
| DE | 42 32 880 A1 | 3/1994 |
| DE | 4332880 A1 | 4/1994 |
| DE | 197 02 259 C1 | 2/1998 |
| DE | 197 40 020 A1 | 3/1999 |
| DE | 198 16 989 A1 | 11/1999 |
| DE | 199 13 095 A1 | 10/2000 |
| EP | 0 458 796 B2 | 5/1995 |

\* cited by examiner

*Primary Examiner*—Peter C. English
(74) *Attorney, Agent, or Firm*—Crowell & Moring LLP

(57) ABSTRACT

A method for triggering a gas generator for an air bag in a motor vehicle having acceleration sensors, air bags, and gas generators uses an air bag control unit for evaluating an impact. Evaluation of the impact takes place by using the signals of the acceleration sensors for triggering a gas generator. The gas generator has a triggerable valve which can be controlled into at least two conditions with a different passage cross-section. The air bag control unit controls the gas generator as a function of the seriousness of an accident such that the position of the valve of the gas generator alternates several times successively between two conditions in order to adapt the inflating operation to the collision.

2 Claims, 3 Drawing Sheets

METHOD OF TRIGGERING A GAS GENERATOR FOR AN AIR BAG IN A MOTOR VEHICLE

This application claims the priority of German application 101 16 926.4, filed Apr. 5, 2001.

BACKGROUND AND SUMMARY OF THE INVENTION

This invention relates to a method for triggering a gas generator for an air bag in a motor vehicle having acceleration sensors, an air bag, a gas generator which supplies a filling medium for filling the air bag, and an air bag control unit. The air bag control unit evaluates a collision by evaluating signals of the acceleration sensors and, by way of a control signal, triggers the gas generator. A volume flow of the filling medium supplied by the gas generator during a filling operation is influenceable by the control signal.

For protection of vehicle occupants in the event of a collision, it is generally known to detect acceleration values by acceleration sensors at different points in the vehicle. By way of a control unit, as a function of the detected acceleration values, restraint devices, such as air bags and belt tightening devices, are triggered.

A method of triggering restraint devices is known from European Patent Document 0458796 B2. In this case, acceleration is measured and, from acceleration values, speed values are generated by integration. The speed values reflect the accident-caused speed reduction. As a criterion for triggering an air bag, a threshold value can be defined for the speed signal. This threshold value is changeable as a function of parameters which are detected during the collision.

Two-stage or multistage gas generators are known for filling an air bag. In such a case, ignition of a second stage takes place in a time-staggered manner after ignition of a first stage. In order to adapt the air bag filling operation to the seriousness of an accident, not all stages of the gas generator are necessarily ignited, or a time period between two ignition points in time is varied.

It is known from German Patent Document DE 19816989 A1 to evaluate the seriousness of an accident according to the amount and course of the accident-caused speed reduction. The speed reduction determined is illustrated in a so-called speed event space as a function of time. This speed event space is divided into several zones, and each zone is assigned in an unambiguous manner to an accident seriousness range. If the accident-caused speed reduction during a given time period takes place, for example, in zone I, then accident seriousness I is assigned to the accident and the triggering of the air bag gas generator provided for accident seriousness I is implemented. In order to be able to adapt the triggering of the gas generator to the seriousness of the accident, a two-stage gas generator is provided.

It is known from German Patent Document DE 19702259 C1 to have a gas generator by which the inflating speed and the inflating pressure can be better adapted to the seriousness of an accident than with a two-stage gas generator. A control element is provided for controlling outflow volume and outflow speed of the compressed gas. The control element can be actuated using a piezoelectric element by way of an amplifying mechanism. Gas flow can be controlled for filling an air bag by the continuous adjustability of the piezoelectric element.

A device for controlling a gas bag arrangement by which an inflating volume can be adapted to the seriousness of an accident after initiating inflation is also known from German Patent Document DE 19740020 A1. For this purpose, several gas generators are assigned to a one-part or multipart gas bag arrangement. Each of these gas generators can be ignited by an ignition signal. By selection of the gas generators to be ignited and their ignition sequence, the inflating characteristic and the inflating volume can be defined.

Another way of adapting the filling of an air bag to a detected seriousness of an accident is known from German Patent Document DE 19913095 A1. Inflating of the air bag is controlled by igniting several primer pellets successively and/or by changing the effective cross-section of a blow-off opening of a gas generator with a controllable valve. A portion of the filling medium for the air bag escapes through the blow-off opening into the environment, so that this air bag is filled less as the cross-section of the blow-off opening increases. An adaptation to the seriousness of an accident thereby can take place.

A two-stage gas generator is known from German Patent Document DE 19816989 A1. In this case, as a function of the seriousness of an accident, one of two stages is or both stages are ignited.

A control system for a vehicle occupant protection device, such as an occupant restraint system, is known from German Patent Document DE 43 32 880 A1. This control system detects vehicle deceleration for controlling the vehicle occupant protection device, and determines an average vehicle deceleration value and a standard value of deviation of the vehicle deceleration.

It is also considered to be known, for controlling the volume flow of the filling medium into the air bag, to control the opening cross-section for the filling medium for filling the air bag by a controllable valve. A control of the opening of the valve corresponds to an indirect control of the volume flow of the filling medium into the air bag.

As an alternative, for the purpose of controlling the volume flow of the filling medium into the air bag, the volume flow of a combustible into a combustion chamber can be controlled by a controllable valve. In the combustion chamber, the combustible generates the filling medium for filling the air bag. The generated volume of the outflowing filling medium depends on the volume of the combustible which is guided into the combustion chamber.

It is an object of the invention to improve triggering of a gas generator for filling an air bag in a motor vehicle. According to the invention, this object is achieved by a gas generator triggering method in which an air bag control unit evaluates a collision by evaluating signals of acceleration sensors and, by way of a control signal, triggers the gas generator so that a volume flow of the filling medium supplied by the gas generator during a filling operation is influenceable by the control signal. The control signal, as a function of evaluation of the collision, is changed several times between two conditions, and filling of the air bag is adapted to collision seriousness by way of repeated changes of the control signal.

A gas generator is triggered by an air bag control unit for filing an air bag. For this purpose, the air bag control unit receives acceleration signals of an acceleration sensor. When triggering is to occur, the control unit generates, by way of analysis of the acceleration signals, a control signal for triggering the gas generator. Triggering of the gas generator influences the volume flow of the filling medium from the gas generator into the air bag. According to the invention, the control signal for triggering the gas generator, as a function of the analysis of the impact, alternates several times between two conditions. As a result of the repeated change of the control signal, filling of the air bag is adapted to the seriousness of the collision. One advantage of the method according to the invention is that, by way of a simple binary triggering of the gas generator, the protective effect of the air bag for the occupants can be adapted to an accident situation.

The repeated change of the control signals between the two conditions may be a periodical change. In the case of a periodical change, triggering of the gas generator can take place by way of a timed signal.

As a further development of the method, the gas generator has an adjustable valve which can be adjusted into at least two adjusting conditions with a different opening cross-section. Triggering of the gas generator takes place such that the position of the valve alternates several times successively between two conditions. The characteristic of the repeated change between the two valve positions is decisive for filling the air bag. The characteristic of the repeated change of the valve positions is particularly affected by the time period during which a valve is in one of the two valve positions, respectively; by the time period which is required in order to control a valve from one valve position into the other valve position; and by the frequency at which the change of the valve positions takes place. A variation of the ratio of the dwell times of the valve in the two valve positions causes a change of the filling operation of the air bag. This method has the advantage that, by way of a simple valve, which can be controlled into two conditions, an adaptation of the mass flow rate to the detected seriousness of the accident can take place during filling of the air bag.

The adjustable valve can be arranged at the filling medium output of the gas generator in order to control the volume flow of the filling medium from the gas generator into the air bag. This has the advantage that the volume flow of the filling medium is controlled directly by the triggered valve.

In an alternative further development, in the case of a gas generator which generates the filling medium for the air bag in a combustion chamber, the triggered valve can control the volume flow of a reactant into the combustion chamber. This alternative further development has an advantage that the volume flow into the chamber is smaller and the valve may have a smaller construction. In addition, the pressure difference between the reactant storage chamber and the combustion chamber can be selected to be smaller than would be possible in the case of the pressure difference between the combustion chamber and the ambient pressure during the filling operation. As a result, the mechanical demands on the valve can be reduced.

In a further development of the process, the two valve adjustments are defined by "open" and "closed" conditions, so that, in the "closed" condition, no gas, or a negligible amount of gas, for filling the air bag flows through the valve, and in the other, "open", condition, a defined amount of gas for filling the air bag flows through the valve. The acceleration signal is evaluated in a predetermined manner. It is an advantage of this further development that triggering of the gas generator is simple. The gas volume for filling the air bag can be defined only by the added-up time period in which the valve is in the "open" position. It is a prerequisite in this case that the time period for the opening operation and the closing operation of the valve be short in comparison to the time periods in which the valve is in the "open" and "closed" positions. If this is not so, then the adjusting time of the valve should additionally be taken into account when determining the gas volume.

A gas generator can also be used when the valve can be controlled into more than two different positions. It is possible, with such a gas generator, to improve the triggering method of the gas generator according to the invention in that, optionally, a change takes place between several valve positions definable by the triggering. A better adaptation of the filling operation of the air bag to an accident can thereby be achieved.

In a further development of the process, gas generator triggering takes place such that the valve of the gas generator opens at a frequency defined by the control signal. After each opening of the valve, the latter remains open for a fixedly definable time period and, after expiration of this time period, the valve is closed again. The predeterminable time period, during which the valve remains open, must be shorter than a period length of the triggering frequency if the valve is not to be open continuously. The frequency for triggering the gas generator is determined by the control unit; an acceleration signal is utilized and the seriousness of an accident is derived therefrom. A frequency is assigned to the seriousness of an accident corresponding to a conversion function or a table, and the gas generator is triggered by this frequency. The triggering frequency is decisive for the filling operation of the air bag. It is an advantage of this further development of the process that, as a result of an assignment of the seriousness of an accident to a frequency, a simple criterion is defined for triggering the gas generator by which the filling operation of the air bag can be adapted in a continuous manner.

Evaluation of the acceleration signal for triggering the valve takes place such that an average acceleration is determined. Determination of the average acceleration can take place, for example, by simply taking the mean of the acceleration signal with respect to the time. As an alternative, the average acceleration is determined from the speed change. The speed change is computed by integration of the acceleration signal and is a frequently used quantity for determining the seriousness of an accident. The slope of the speed change curve, when representing the speed change as a function of time, corresponds to acceleration. A linear regression of the speed change curve corresponds to an average acceleration. By way of the average acceleration, a parameter is used for triggering the gas generator which permits good differentiation between various degrees of seriousness of an accident. The advantage of this further development of the method is the fact that only a linear regression has to be carried out for evaluating the speed change.

In an alternative further development, the method can be implemented by way of a gas generator which, instead of a controllable valve, has a reactant which can be ignited in discrete steps. For example, a discrete arrangement of combustible pellets can be provided with respective triggerable ignitors so that each combustible pellet can be ignited individually.

As a further development of the method, a voltage signal is assigned to the determined average acceleration, which voltage signal relates the acceleration to a voltage. By way of a voltage/frequency converter, the frequency for triggering the gas generator is produced from the voltage signal. Thus, the frequency for triggering the gas generator can be generated in a simple manner.

In addition to the adaptation of the filling operation of the air bag to the detected seriousness of an accident, by way of the method according to the invention, an adaptation of the filling operation to the occupants of a vehicle, for example, to their heights, weights and positions, can also take place. Driving-dynamic quantities, such as the weight of the vehicle itself, and environmental quantities, such as the differential speed between the vehicle and a collision object, can be used as additional parameters for controlling the gas generator. In situations in which an occupant may be endangered by the filling of the air bag, triggering of the gas generator may be changed such that the risk of an injury arising because of air bag inflation is considerably reduced.

In a method according to the invention for triggering a gas generator, a correction of the preceding accident evaluation is possible because the filling operation can still be changed during the filling operation. The decision concerning the seriousness of an accident can therefore be made with a certain fuzziness, whereby an early decision is permitted. This permits an early filling of the air bag, whereby its protective effect is increased and the stress to the occupants caused by the air bag is simultaneously reduced.

BRIEF DESCRIPTION OF THE DRAWINGS

In the following, an advantageous embodiment of the method according to the invention is described in detail by referring to the drawing figures.

DETAILED DESCRIPTION OF THE INVENTION

Figure 1:
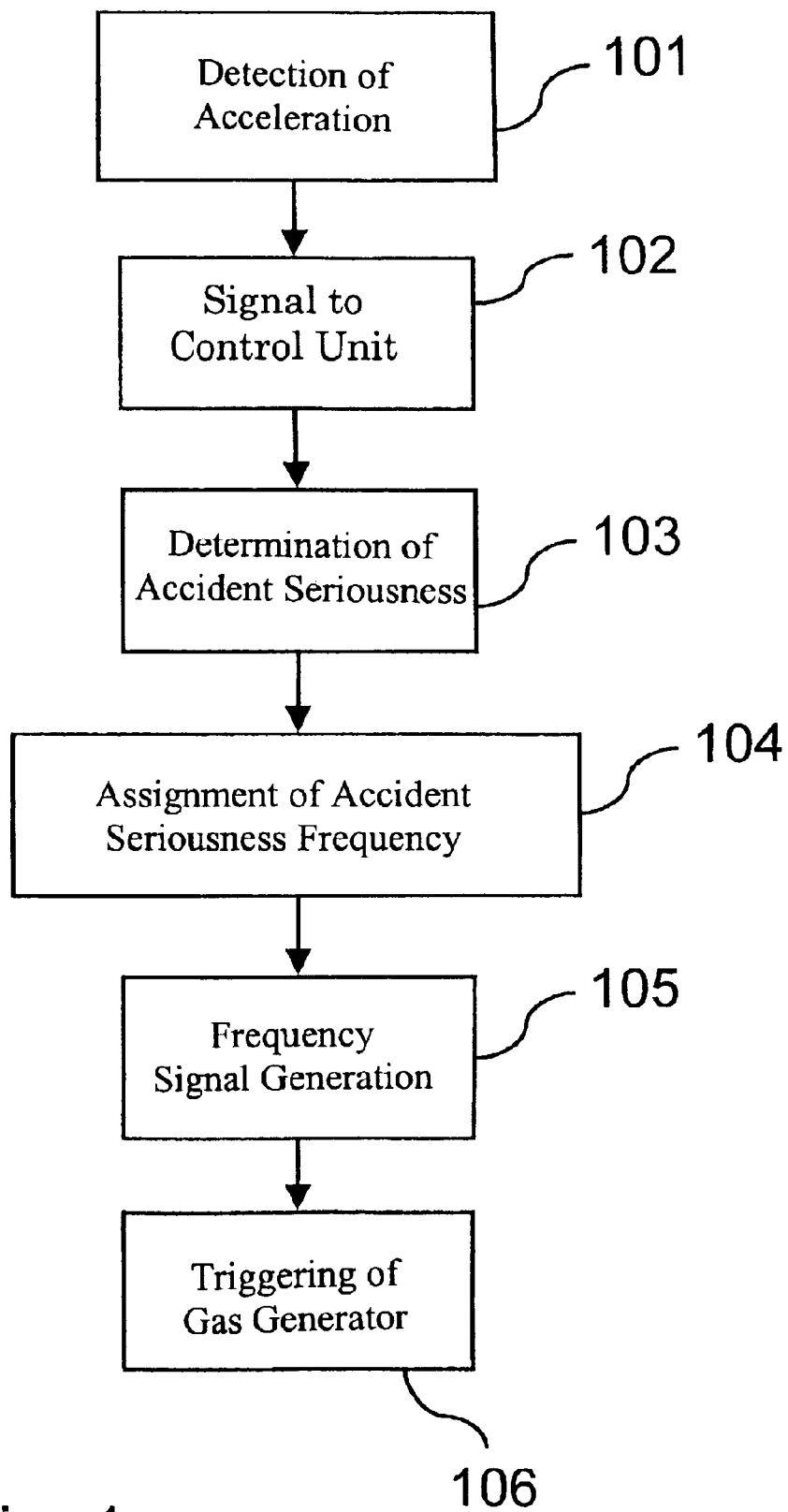
FIG. 1 is a simple flow chart of the process according to the invention for triggering a gas generator.

FIG. 1 is a simple flow chart of the method of triggering a gas generator according to the invention. In step 101, an acceleration sensor detects an acceleration; and in step 102, an acceleration signal is transmitted to a data processing unit, for example, an air bag control unit. In the data processing unit, signal processing takes place in step 103; that means that the seriousness of an accident is determined from the acceleration signal. In this case, additional data, for example, acceleration signals of other sensors, can be used. When the seriousness of an accident has been determined, in step 104, corresponding to a definable function, a frequency is assigned to the determined seriousness of an accident, which frequency is used for triggering the gas generator. Subsequently, as required, a frequency signal is generated in step 105, and by means of the frequency signal, the gas generator is triggered in step 106.

Figure 2:
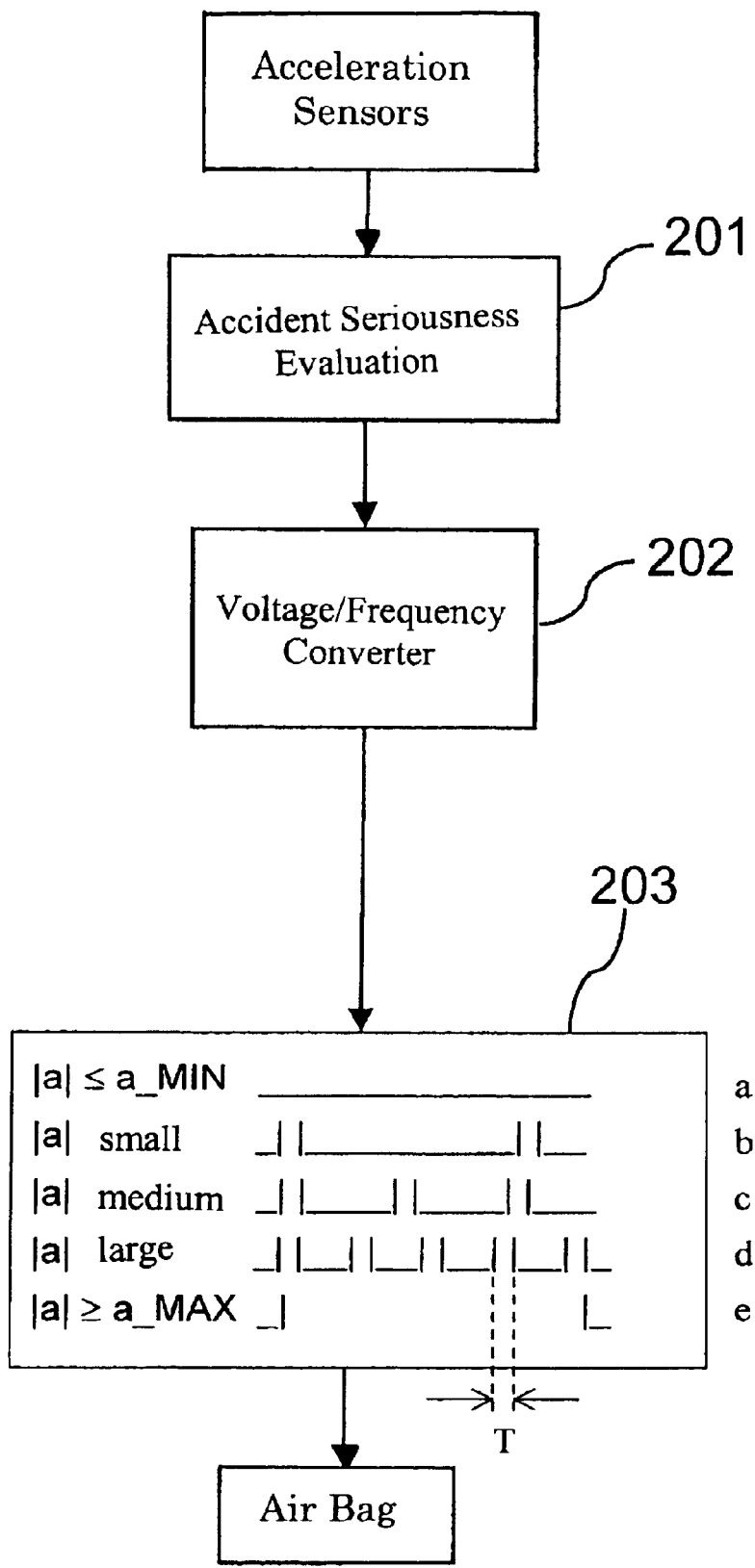
FIG. 2 is a simple block diagram of a system for implementing an advantageous further development of the process in which the gas generator is triggered by a frequency signal.

FIG. 2 is a simple block diagram of a system for implementing an advantageous further development of the method, the gas generator being triggered by means of a frequency signal. In the signal-processing part 201, an average acceleration is determined from the acceleration signal as a measurement of the seriousness of an accident. By means of the determined seriousness of an accident, a constant voltage signal, with a voltage which rises with the seriousness of an accident, is generated. This voltage signal is transmitted to a voltage/frequency converter 202 in which the voltage signal is converted to a frequency signal. The frequency signal is the triggering signal for the gas generator 203. In the example of FIG. 2, the frequency signal is a pulse-type signal, in which case the valve of the gas generator is opened if the frequency signal has an ascending edge. The pulses for triggering the gas generator have a defined length of time T, so that an increase of the frequency causes an increase of the volume flow for filling the air bag. The air bag will therefore be filled faster when the triggering frequency is higher.

If the seriousness of an accident $|a|$ is below a triggering threshold a_MIN, the control signal contains no pulses (see row "a" in the block representing gas generator 203) for opening the gas generator valve, the triggering frequency amounts to 0 Hz, and the valve is not opened. Starting at a definable seriousness of an accident, the voltage/frequency converter 202 generates a frequency higher than 0 Hz and the air bag is filled (see row "b" in the block representing gas generator 203). With an increasing seriousness of an accident $|a|$, the frequency of the triggering signal is increased (see rows "c" and "d" in the block representing gas generator 203) so that the air bag is filled more rapidly. If the seriousness of an accident $|a|$ has exceeded a defined value a_MAX, the valve is continuously held in the opened condition (see row "e" in the block representing gas generator 203). This threshold is reached at the latest when half the period length of the triggering frequency is shorter than the defined length of the control pulses T.

The total filling volume of the air bag can be controlled independently of the filling speed. The filling volume at a considered point in time is the added-up filling quantity of the filling gas, minus the quantity of the filling gas which had already escaped from the air bag. The total filling volume at the end of the filling operation can be changed by the control of the filling operation, particularly by controlling the total duration of filling.

Figure 3:
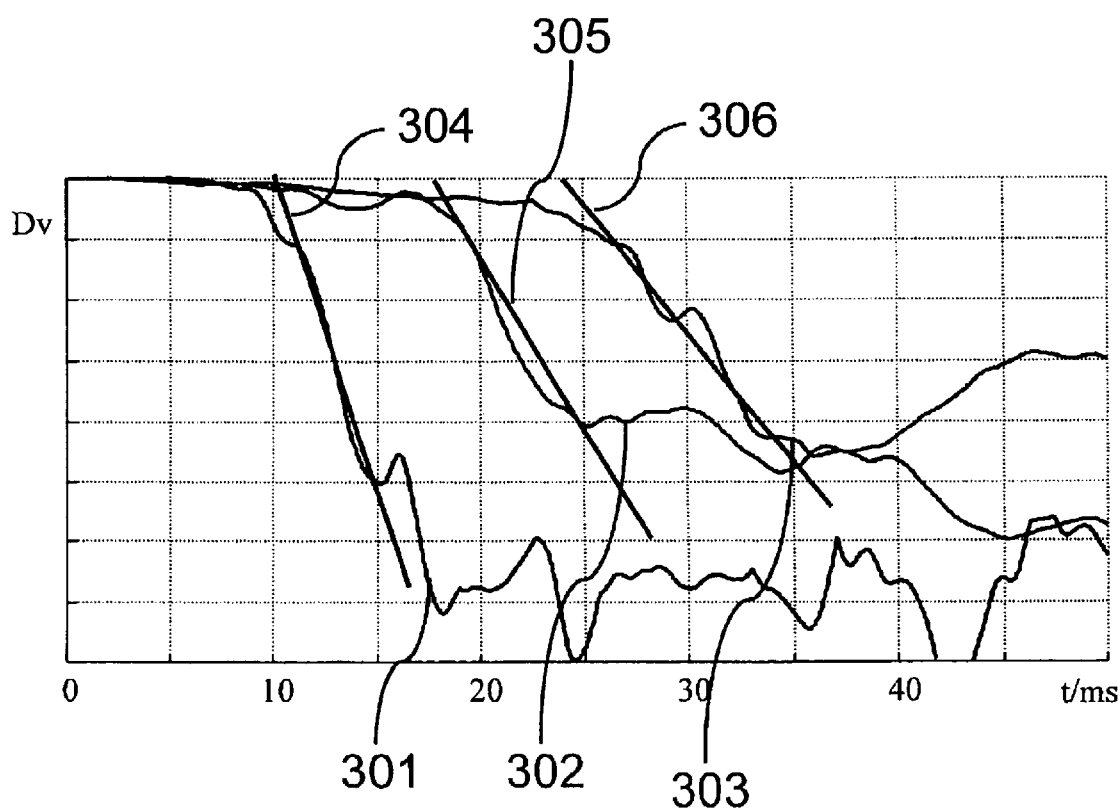
FIG. 3 is a representation of the time sequence of the detected speed changes of a vehicle in the case of different degrees of seriousness of an accident.

FIG. 3 is a representation of the time sequence of the determined speed change of a vehicle in the cases of different degrees of seriousness of an accident. The speed change as a function of the time is entered for three different degrees of seriousness of an accident (301, 302, 303). The illustrated speed changes correspond to a frontal collision with an increasing accident seriousness, starting from the lowest seriousness in curve 303 to the highest seriousness in curve 301. As acceleration of the vehicle relevant for triggering the air bag occurs earlier, the impact which took place at t=0 s is stronger. In the case of the strongest impact, the acceleration clearly occurs earlier (approximately 0.01 s after impact, curve 301) than in the case of the weakest impact (approximately 0.025 s after the impact, curve 303). In addition, the curve of the speed change becomes steeper as the accident is increasingly serious, so that the ascending of a straight regression line (306, 305, 304) is a good criterion for the seriousness of an accident.

It is also possible to carry out a regression at a relatively early point in time and to trigger the gas generator correspondingly early because, by means of the method according to the invention, a change or correction of the filling operation can still be made during the air bag filling operation. For this purpose, only a change of the triggering frequency is required. For example, a first linear regression can always be carried out and, if required, the gas generator can be triggered when the speed difference Dv between a point in time t and a point in time t+t1 exceeds a definable value. The speed difference Dv and the time t1 are defined such that, for triggering the gas generator for filling the air bag, it can be ensured that the speed change Dv is caused by an accident. In the case of FIG. 3, the time t1 can, for example, be selected as t1=0.005 s.

In an alternative embodiment to the two embodiments according to the invention described above, in the case of which, by means of the adjustable valve at the generator output, the volume flow of the filling medium is controlled into the air bag or, by means of the adjustable valve at the gas generator input, the volume flow of the reactant is controlled into the gas generator, the volume flow of the filling medium is influenced for filling the air bag by means of the adjustable valve at a gas generator outflow opening provided for the flowing-off of the filling medium into the environment. The flowing-off of the air bag filling medium from the gas generator into the environment is controlled by means of the valve at the gas generator outflow opening. As a result, the pressure in the gas generator is influenced, whereby the inflating characteristic of the air bag is indirectly influenced. Thus, by means of this adjustable valve, the volume flow of the filling medium for filling the air bag is indirectly controlled because the pressure in the gas generator is an essential parameter for the inflating characteristic of the air bag.

When implementing the process according to the invention for triggering a gas generator having a valve provided at a gas generator outflow opening for discharging the filling medium into the environment, the triggering of the gas generator for opening the valve must take place such that, from the voltage/frequency converter 202, an assignment of the determined seriousness of an accident or of the detected acceleration to a triggering signal for the gas generator 203 takes place inversely to FIG. 2. When the seriousness of an accident is low or when the acceleration is low, a signal must be emitted corresponding to row "e" in the block representing gas generator 203 in order to achieve an extensive pressure reduction in the gas generator by way of the adjustable valve at the gas generator outflow opening. When the seriousness of the accident is considerable or when the acceleration is high, a signal corresponding to the row "a" in the block representing gas generator 203 or no signal at all for opening the valve is emitted. If, by way of the valve at the gas generator outflow opening, little or no filling medium can escape into the environment, the air bag is filled rapidly and/or extensively. Therefore the effect of a valve on a gas generator outflow opening is exactly inverse to the effect of a valve at the gas generator output, so that triggering has to take place correspondingly with an inverse assignment of the accident seriousness signal to the control signal for the valve.

A combined triggering of the gas generator by means of a valve at the gas generator input and/or a valve at the gas generator output and/or at a gas generator outflow opening is also possible. In particular, the process according to the invention for triggering a gas generator is well suited for a gas generator having a valve at the gas generator output and a valve at a gas generator outflow opening. In this case, a rapid and well controllable filling of the air bag by means of an air bag filling medium is achieved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A method of triggering a gas generator for an air bag for use in a motor vehicle, having acceleration sensors, an air bag, a gas generator which supplies a filling medium for filling the air bag, and an air bag control unit which evaluates a collision by evaluating signals of the acceleration sensors and which, by way of a control signal, triggers the gas generator, a volume flow of the filling medium supplied by the gas generator during a filling operation being influenceable by the control signal, comprising:

changing the control signal, as a function of evaluation of the collision, to adjust the gas generator triggering frequency and adapt filling of the air bag to collision seriousness, wherein evaluation of a collision for triggering the gas generator takes place based on a determined average acceleration, wherein a signal for the average acceleration is generated which unambiguously assigns a voltage to an acceleration, and wherein the control signal is generated by way of a voltage/frequency converter from the signal for the average acceleration.

2. The method according to claim 1, wherein the average acceleration is determined by way of a linear regression of a course of a curve of speed change as a function of time.

* * * * *